United States Patent [19]

Edwards et al.

[11] 4,231,224
[45] Nov. 4, 1980

[54] MASTER CYLINDER ASSEMBLIES FOR VEHICLE HYDRAULIC BRAKING SYSTEMS

[75] Inventors: Roy E. Edwards, Warley; Anthony G. Price, Birmingham; John R. Rees, Halesowen, all of England

[73] Assignee: Girling Limited, Birmingham, England

[21] Appl. No.: 841,287

[22] Filed: Oct. 12, 1977

[30] Foreign Application Priority Data

Oct. 12, 1976 [GB] United Kingdom ............. 42254/76

[51] Int. Cl.³ .............................................. F15B 7/00
[52] U.S. Cl. ........................................ 60/581; 60/589
[58] Field of Search ................. 60/546, 581, 592, 589; 137/517, 529

[56] References Cited

U.S. PATENT DOCUMENTS 3,421,320  1/1969  Kershner .............................. 60/581
3,875,850  4/1975  Reynolds ............................ 137/517
4,006,593  2/1977  Edwards .............................. 60/581

FOREIGN PATENT DOCUMENTS 1381407  1/1975  United Kingdom .

Primary Examiner—Abraham Hershkovitz
Attorney, Agent, or Firm—Scrivener, Parker, Scrivener and Clarke

[57] ABSTRACT

In a master cylinder assembly of the kind in which transfer chambers in pedal-operated master cylinders are connected by a transfer passage, each master cylinder has a transfer valve which is normally open and which is movable into a closed position to isolate the transfer chamber of that master cylinder from a reservoir in response to an increase in pressure in the transfer chamber when the other master cylinder is operated on its own.

2 Claims, 2 Drawing Figures

MASTER CYLINDER ASSEMBLIES FOR VEHICLE HYDRAULIC BRAKING SYSTEMS

SPECIFIC DESCRIPTION

This invention relates to master cylinder assemblies for vehicle hydraulic braking systems of the kind commonly used on agricultural tractors and like vehicles in which transfer chambers in pedal-operated master cylinders are connected by a transfer port or passage through transfer valves which are adapted to be fully opened by axial movement of pistons in brake applying directions.

The master cylinders can be operated simultaneously for retarding the vehicle or separately for steering.

In known master cylinders of the kind set forth the transfer valves are normally closed and are operated by axial movement of the piston in the brake applying direction. Such a construction is covered by our Pat. No. 1,381,407 which also incorporates pressure relief means comprising a further valve additional to the transfer valves to define a leak path between the transfer chamber of the master cylinder in which it is incorporated and the reservoir at least when the transfer valve with which it is associated is closed. This compensates for increase in pressure in the transfer chambers when the transfer valves are closed, due to thermal expansion of the hydraulic fluid.

According to our present invention in a master cylinder assembly of the kind set forth for a vehicle braking system the transfer valve of each master cylinder is normally open and each transfer valve is movable into a closed position to isolate the transfer chamber of that master cylinder from the reservoir in response to an increase in pressure in the transfer chamber when the other master cylinder is operated on its own.

Preferably the transfer valve of each master cylinder incorporates a flow restrictor which permits a restricted flow between the transfer chamber of that master cylinder and the reservoir when the transfer valve is open.

A simplified construction is achieved by arranging for the transfer valves to be normally open and incorporating flow restrictors, since the functions of isolating the pressure space from the reservoir of one master cylinder when the other is operated, and of providing pressure relief means to compensate for thermal expansion of hydraulic fluid in the transfer chambers, is provided in the transfer valve of each master cylinder without the provision of additional valves or other auxiliary means.

Preferably each transfer valve comprises a seating carried by a member which is movable in a brake-applying direction when that master cylinder is operated, and including an axial extension, a valve member responsive to pressure in the transfer chamber and extending into the extension, a first spring for biassing the valve member normally away from the seating, and a clearance between the valve member and the extension defining a restricted flow path between the transfer chamber and the reservoir when the valve member is biassed away from the seating, the valve member being movable into engagement with the seating to close the flow path and the transfer valve when the pressure in the transfer chamber exceeds the force in the spring. A second spring of which the pre-load is substantially less than the first spring may bias the valve member towards the seating such that the valve member moves into engagement with the seating when the pressure in the transfer chamber exceeds the net force difference of the two springs.

Conveniently the member carrying the seating comprises the forward end of a pedal-operated piston of the master cylinder, and the valve member is of cup-shaped outline and is coupled for relative axial movement through a limited distance to one end of an axially extending rod which it surrounds and of which the other opposite end remote from the piston carries a head for engagement with a seating surrounding a recuperation port connected to the reservoir, the spring acting between the valve member and the rod normally to urge the valve member into engagement with a stop on the rod which defines the distance by which the valve member can be moved away from the seating, and the seating being movable relatively away from the valve member in response to movement of the piston in a brake applying direction to pressurise fluid in a pressure space in advance of the piston and after the head has engaged with the seating surrounding the recuperation port to isolate the reservoir from the pressure space.

One embodiment of our invention is illustrated in the accompanying drawings in which.

Figure 1:
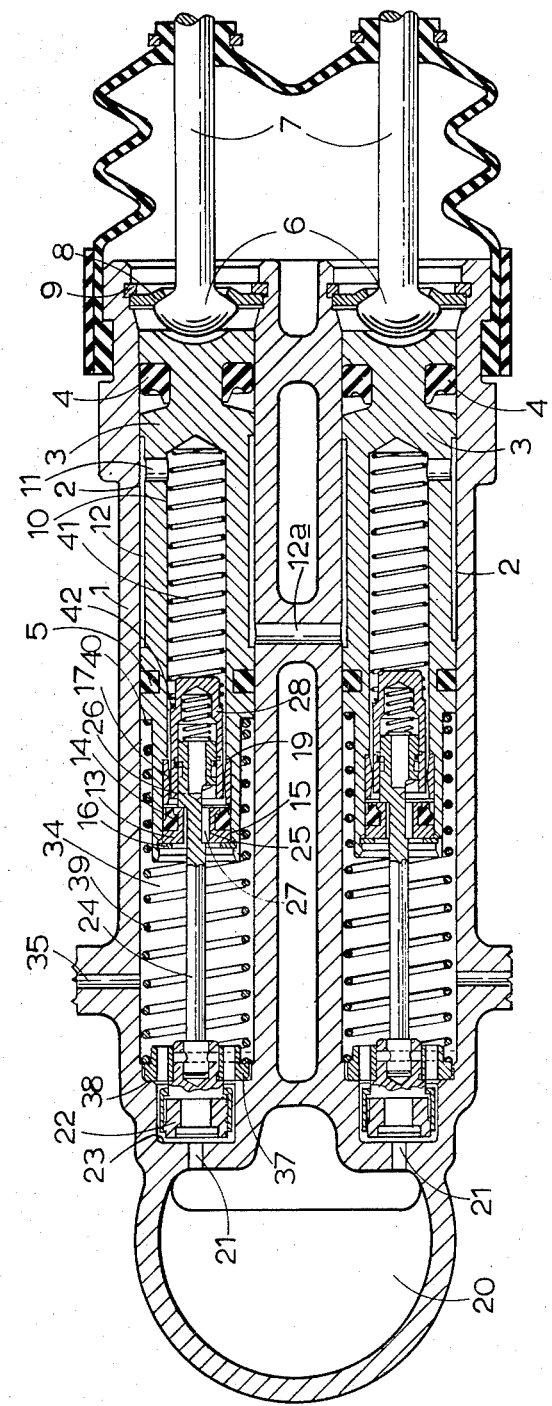
FIG. 1 is a longitudinal section through a dual master cylinder assembly.
Figure 2:
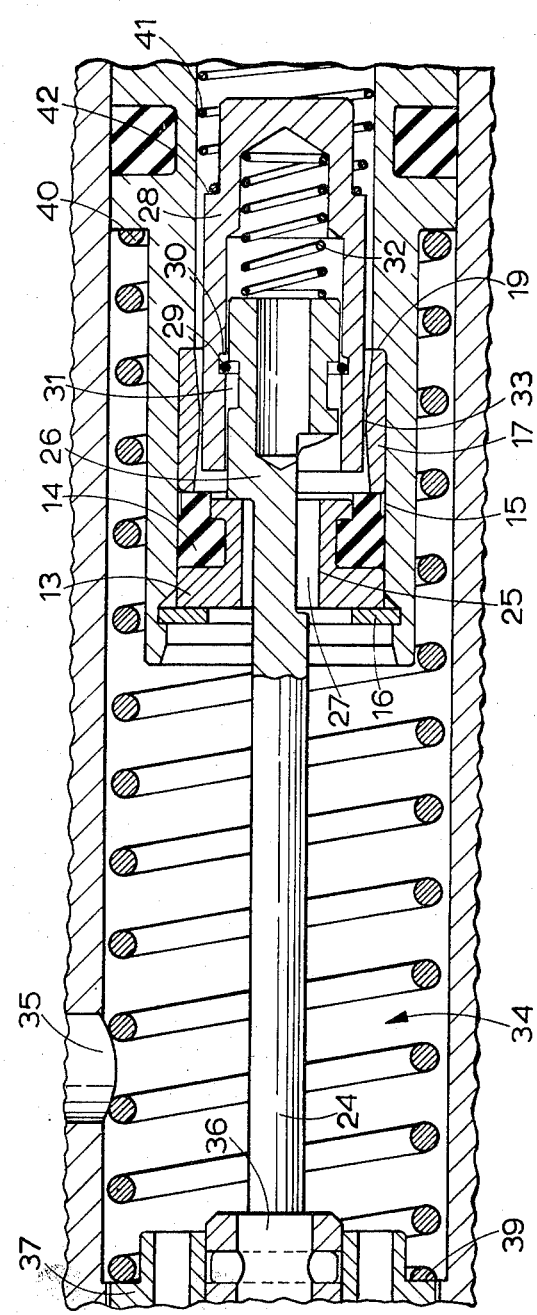
FIG. 2 is a section on an enlarged scale of a part of one of the master cylinders of FIG. 1.

A dual master cylinder assembly as illustrated in FIG. 1 comprises two master cylinders arranged side-by-side in parallel with each master cylinder being operable by its own pedal. The two master cylinders are identical in construction and each comprises a body 1 provided with a longitudinal bore 2 in which works an hydraulic piston 3 having spaced seals 4 and 5. The piston 3 is engaged at its rear end by a part-spherical head 6 on a pedaloperated push rod 7. A stop for the head 6 is formed by an annular collar 8 located by a spring ring or circlip 9 received in an annular groove in the bore 2.

An axial passage 10 is defined in the piston 3 from its forward end for at least one half of its length and adjacent to its inner end the passage 10 is in communication through radial ports 11 with an annular recess 12 of substantial axial length in the peripheral surface of the piston 3 and extending between the seals 4 and 5. The length of the recess 12 in each master cylinder is such that in all axial positions of the piston 3 it is in communication through an external transfer connection and a radial transfer port 12a in the wall of the body 1 with the corresponding recess 12 in the other master cylinder. The axial passage 10 and the annular recess 12 together define a transfer chamber.

A plug is incorporating a resiliently deformable annular sealing ring 14 is retained in a counterbore 15 at the forward end of the passage 10 by means of an annular retaining ring 16 in abutment with the forward end of the plug 13 and a spacer sleeve 17 is clamped between the sealing ring 14 and a shoulder 10 at the step in diameter between the passage 10 and the counterbore 15. The minimum internal diameter of the sleeve 17 is greater than that of the sealing ring 14 which therefore projects radially inwards of the sleeve 17. In the construction illustrated the sleeve 17 is formed with conically tapered bores of substantially equal lengths which extend inwardly from opposite ends of the sleeve and merge at a cylindrical portion which is substantially equi-distant from both ends of the sleeve 17. Alternatively the internal face of the sleeve 17 may be axially convex.

The forward end of the bore 2 is in communication with a reservoir 20 for hydraulic fluid through a recuperation port 21 in the body 1 which is controlled by a recuperation valve comprising a washered head 22 for engagement with a valve seating 23 surrounding the port 21. The head 22 is carried by the forward end of an axially extending rod 24 of which the opposite ends projects through a bore 25 in the plug 13 and is provided with an enlargement 26 defining a head which engages with the inner end of the plug 13 to define a stop. The head 26 and the rod 24 are relieved at 27 to provide fluid communication past the plug 13.

In an alternative embodiment the common reservoir 20 may be replaced by two independent reservoirs for the two master cylinders so that each has an independent reserve of fluid.

A valve member 28 of cup-shaped outline is slidably mounted on the head 26 and projects into the passage 10. The valve member 28, the spacer sleeve 17 and the sealing ring 14 define a transfer valve. The valve member 28 is coupled to a head 26 by means of a circlip 29 which is located in an internal radial groove 30 in the valve member 28 and is received in an external radial groove 31 in the head 26. The groove 31 is limited in length to permit a limited axial movement of the valve member 28 with respect to the head 26. Normally however, a compression spring 32 urges the valve member 28 away from the head 26 so that edge of the groove 30 which is adjacent to the plug 13 and the edge of the groove 31 which is remote from the plug 13 both engage the circlip 29, but the skirt of the valve member 28 projects through the spacer sleeve 17 to a position adjacent to the sealing ring 14 with the tapered bore at that end of the sleeve 17 defining a smooth lead-in for the valve member 28. In that position an annular clearance 33 between the valve member 28 and the sleeve 17 defines a restricted flow path between the transfer chamber and a pressure space 34 between the piston 3 and the end of the body 1 remote from the pedal. The pressure space is adapted to be connected to a wheel brake actuator through a radial port 35.

A portion 36 of the rod 24 which carries the head is guided to slide through an apertured member 37 in abutment with a shoulder 38 at a step in diameter in the bore 2 and forming an abutment for one end of a compression return spring 39 of which the opposite end engages with an abutment face 40 of the piston 3. A light compression spring by of which the pre-load is substantially less than that of the compression spring 32 acts between the closed end of the axial passage 10 and an external shoulder 42 at the adjacent end of the valve member 28 to bias the head 22 into engagement with the valve seating 23 when the piston 3 is moved in the brake applying direction.

In the position shown in the drawings in which the piston 3 is held in a fully restracted position by the compression spring 39, the recuperation valve is open and the transfer valve is open. Thus, the pressure space 34 is in free communication with the reservoir but is in restricted communication with the transfer chamber through the annular flow path 33.

When the piston is advanced in the bore 2 by operation of the brake pedal with corresponding compression of the spring 39 a short forward movement is sufficient to cause the head 22 to engage with the seating 23 to isolate the pressure space 34 from the reservoir. Thereafter, further movement of the piston 3 in the same direction pressurises the fluid in the pressure space 34 which is supplied to the wheel brake actuator through the ports 35 and, during this movement the sealing ring 14 and the sleeve 17 are both moved relatively away from the valve member 28 to increase the effective area of the annular clearance 33 to facilitate the transfer of the pressurised fluid into the transfer chamber.

When both master cylinders are operated simultaneously, the pressures in the two transfer chambers, and in consequence the pressure chamber, equalize through the transfer connection 12a to compensate for differential wear of the friction linings, and differential braking running clearance adjustments, and the valve members 28 remain in their neutral positions. However, if only one master cylinder is operated, the increased fluid pressure in the transfer chamber of the operated master cylinder acts on the closed end of the valve member 28 of the non-operated master cylinder to urge it axially with respect to the head 25 and into engagement with the sealing ring 14 to isolate that transfer chamber from the pressure space of that master cylinder. This prevents the pressure fluid from being returned to the reservoir through the recuperation valve which is open.

Normally in an inoperative position both transfer valves are open to permit a restricted flow between the transfer chambers and the reservoir to compensate for thermal expansion of the fluid.

We claim:

1. An hydraulic master cylinder assembly for a vehicle braking system comprising two separate first and second master cylinders, each said master cylinder comprising a piston adapted to work in a bore, a pressure space in said bore in front of said piston, means defining a transfer chamber, a recuperation port for connection to a reservoir for fluid and a transfer valve which is movable between a fully open position by movement of said piston in a direction to pressurize hydraulic fluid in said pressure space and a closed position to isolate said transfer chamber of that master cylinder from said recuperation port therefor, and said transfer chambers are connected by a transfer passage, wherein said transfer valves are normally open and said transfer valve of each master cylinder incorporates pressure-responsive means responsive to pressure in said transfer chamber of a corresponding one of said master cylinders, said pressure-responsive means in said first master cylinder being operative to urge said transfer valve of said first master cylinder into said closed position when pressure in said transfer chamber of said first master cylinder is increased by pressurization of hydraulic fluid in said pressure space of said second master cylinder by transfer of hydraulic fluid through said transfer chamber when said second master cylinder is operated on its own, and said pressure-responsive means in said second master cylinder being operative to urge said transfer valve of said second master cylinder into said closed position when pressure in said transfer chamber of said second master cylinder is increased by pressurization of hydraulic fluid in said pressure space of said first master cylinder by transfer of hydraulic fluid through said transfer chamber when said first master cylinder is operated on its own, and wherein each of said transfer valves comprises a seating, a member which is movable in a brake-applying direction when that master cylinder is operated carrying said seating, said member including an axial extension, a valve member responsive to pressure in said transfer chamber and extending into said extension, a first spring for biassing said valve member normally away from said seating, and means defining a restricted flow path between said transfer chamber and said recuperation port when said valve member is biassed away from said seating, and wherein said member carrying said seating comprises the forward end of said pedal-operated piston of said master cylinder, and an axially extending rod is coupled for relative axial movement through a limited distance at one end to said valve member, said valve member surrounding said rod and the other opposite end of said rod remote from said piston carrying a head for engagement with a seating surrounding said recuperation port, said rod carrying a stop and said first spring acting between said valve member and said rod normally to urge said valve member into engagement with said stop, said stop defining a distance by which said valve member can be moved away from said seating, and said seating being movable relatively away from said valve member in response to movement of said piston in a brake applying direction to pressurize fluid in said pressure space and after said head has engaged with said seating surrounding said recuperaton port to isolate said reservoir from said pressure space.

2. A master cylinder assembly as claimed in claim 1, wherein a second spring having a pre-load substantially less than that of said first spring biasses said valve member towards said seating, said valve member being movable into engagement with said seating to close said flow path and said transfer valve when the pressure in said transfer chamber exceeds the net force difference of said first and second springs.

* * * * *